(12) United States Patent (10) Patent No.: US 9,135,435 B2
Venkat et al. (45) Date of Patent: Sep. 15, 2015

(54) BINARY TRANSLATOR DRIVEN PROGRAM STATE RELOCATION

(71) Applicant: Intel Corporation, Santa Clara, CA (US)

(72) Inventors: Ashish Venkat, San Diego, CA (US); Arvind Krishnaswamy, San Jose, CA (US); Koichi Yamada, Los Gatos, CA (US); Palanivelrajan Rajan Shanmugavelayutham, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/766,233

(22) Filed: Feb. 13, 2013

(65) Prior Publication Data

US 2014/0229717 A1 Aug. 14, 2014

(51) Int. Cl.
*G06F 21/00* (2013.01)
*G06F 21/52* (2013.01)
*G06F 21/79* (2013.01)

(52) U.S. Cl.
CPC .............. *G06F 21/52* (2013.01); *G06F 21/79* (2013.01)

(58) Field of Classification Search
CPC ....... H04L 63/10; H04L 63/20; H04L 63/428; G06F 21/79; G06F 21/52
USPC .............................................. 726/22; 712/25
See application file for complete search history.

(56) References Cited

U.S. PATENT DOCUMENTS

| 5,579,511 | A * | 11/1996 | Cavasa et al. ................. 703/27 |
| 6,014,513 | A * | 1/2000 | Voelker et al. ............... 717/131 |
| 6,243,668 | B1 * | 6/2001 | Le et al. ......................... 703/27 |
| 6,522,422 | B1 * | 2/2003 | Klingler et al. ............. 358/1.15 |
| 6,826,748 | B1 * | 11/2004 | Hohensee et al. ............ 717/130 |
| 7,009,101 | B1 * | 3/2006 | Setoguchi et al. ............. 84/615 |
| 8,239,948 | B1 * | 8/2012 | Griffin et al. .................. 726/24 |
| 2003/0161172 | A1 * | 8/2003 | Civlin ............................ 365/49 |
| 2005/0060696 | A1 | 3/2005 | Bicsak et al. |

(Continued)

FOREIGN PATENT DOCUMENTS

WO 2012154664 11/2012

OTHER PUBLICATIONS

International Search Report and Written Opinion from related PCT/US2014/014852 mailed May 12, 2014.

*Primary Examiner* — Hadi Armouche
*Assistant Examiner* — Shahriar Zarrineh
(74) *Attorney, Agent, or Firm* — Grossman, Tucker, Perreult & Pfleger, PLLC

(57) ABSTRACT

This disclosure is directed to binary translator driven program state relocation. In general, a device may protect vulnerable program functions by setting them as non-executable. If an attempt is made to execute a protected program function, the program may trap to a binary translator in the device that may be configured to relocate program state from what has already been established (e.g., on a stack register). Program state may include resources (e.g., memory locations) used by the program during the course of execution. The binary translator may then translate the program into an executable form based on the relocated program state, and may be executed accordingly. Intruding code that attempts to overcome normal program execution and implement hostile operations (e.g., based the program state that is reflected in the stack register) will not function as intended since the relocated program state will cause unexpected results.

24 Claims, 6 Drawing Sheets

(56) References Cited

U.S. PATENT DOCUMENTS

| | | | |
|---|---|---|---|
| 2008/0282345 A1* | 11/2008 | Beals | 726/21 |
| 2009/0172651 A1* | 7/2009 | Need et al. | 717/146 |
| 2009/0313700 A1 | 12/2009 | Horne | |
| 2011/0016508 A1* | 1/2011 | Wallace | 726/1 |
| 2012/0167120 A1 | 6/2012 | Hentunen | |
| 2012/0278665 A1* | 11/2012 | Serebryany et al. | 714/53 |
| 2012/0284792 A1* | 11/2012 | Liem | 726/22 |
| 2012/0297146 A1* | 11/2012 | Guthrie et al. | 711/141 |
| 2012/0331303 A1 | 12/2012 | Andersson et al. | |
| 2014/0041026 A1* | 2/2014 | Scott | 726/22 |

\* cited by examiner

FIG. 3

Example Program Code With Relocation 302

```
mov 0x8(%esp),%eax
mov 0xc(%esp),%ebx     } 304
mov 0x10(%esp),%ecx
mov %ecx, 0X8(%esp)
...
...
mov 0x8(%esp),%edx
mov %ebx,%ecx
mov %eax,%ebx          } 306
mov $0x4, %eax
call *%/gs:0X10
...
ret
```

Example Program Code 300

```
...
...
mov 0x10(%esp),%edx
mov 0xc(%esp),%ecx
mov 0x8(%esp),%ebx
mov $0x4, %eax
...
ret
```

BINARY TRANSLATOR DRIVEN PROGRAM STATE RELOCATION

TECHNICAL FIELD

The present disclosure relates to device security, and more particularly, to a system for enhancing security against malware through binary translator driven program state relocation.

BACKGROUND

Electronic security has evolved into a more prominent concern as people are increasingly conducting personal and/or confidential transactions electronically. In addition, hackers and/or others with malicious intent are becoming increasingly more creative in circumventing existing security measures in devices. To combat evolving and pervasive incursions by malware and/or viruses, equipment and/or software manufacturers are continuing to make protection measures more intrinsic to the hardware of new devices. For example, in response to situations wherein foreign code is injected into programs to steal information from, or even take over control of, a device, new protection schemes including code signing and non-executable memory segments were implemented. These security provisions allow programs to be authenticated and even for certain vulnerable code to be marked as non-executable at the hardware level. For example, attempts to inject foreign code or to execute protected code would cause hardware control resources in a processor such as a hypervisor to intervene to protect the integrity of the system.

However, enterprising programmers figured out a way to circumvent these protections. For example, in return-oriented programming (ROP) an attacker may hijack the control flow of a device to access certain program functions (e.g., gadgets). A gadget may, in general, comprise a set of program instructions. For example, gadgets may include portions of programs that may support rudimentary functionality essential to program operation (e.g., reading data, writing date, mathematical operations, etc.). When executed in the manner, sequence, etc. intended by programmers of beneficial software, gadgets have no ill effect on a device operation. However, upon wresting control of the control flow in a device, it is possible for gadgets to be manipulated (e.g., to be invoked in different sequences, with different arguments, etc.) to result in operations totally different from what was originally intended, and that may be able to overcome existing protection schemes. Moreover, currently proposed security measures to protect against ROP are either very difficult to implement or may be possible to overcome through a brute force attack.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 3 illustrates example code added to a program to implement binary translator driven program state relocation in accordance with at least one embodiment of the present disclosure;

Figure 1:
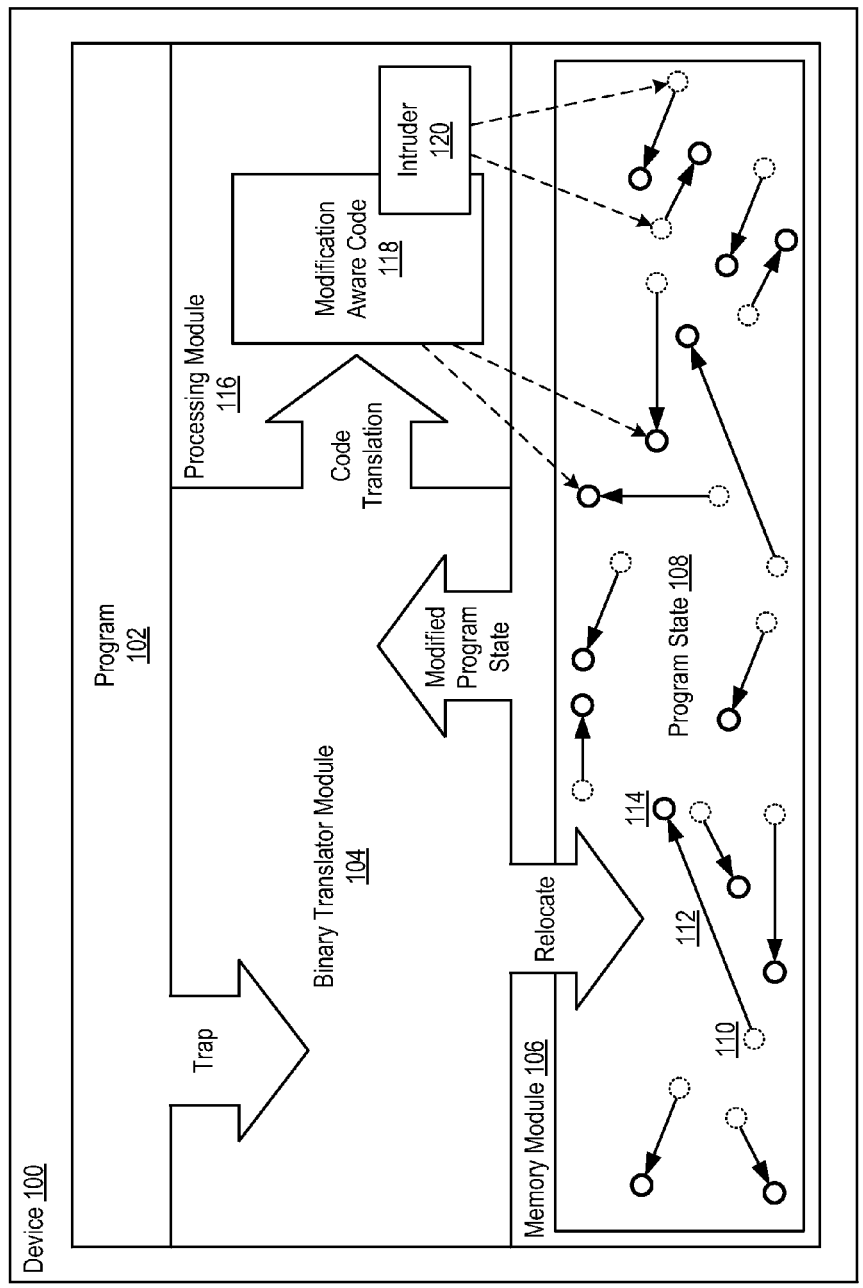
FIG. 1 illustrates an example of binary translator driven program state relocation in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to binary translator driven program state relocation. In general, a device may protect vulnerable program functions by setting them as non-executable. If an attempt is made to execute a protected program function, the program may trap to a binary translator in the device that may be configured to relocate program state from what has already been established (e.g., on a stack register). Program state, as referred to herein, may include any resources (e.g., temporary data stored in memory locations) that a program may establish during the course of execution. The binary translator may then translate the program into an executable form (e.g., binary code) based on the relocated program state, and may be executed accordingly. Intruding code that attempts to overcome the normal program execution and implement hostile operations (e.g., based the original program state that is reflected in the stack register) will not function as intended since the relocated program state will perpetuate unexpected results.

In one embodiment, a device may comprise, for example, a memory module, a binary translator module and a processing module. The memory module may be to maintain program state information corresponding to a program. The binary translator module may be to receive an indication of an attempt by the program to execute a protected function, to cause at least one element of the program state information to be relocated in the memory module, and to translate instructions in the program into executable binary code based on the relocated at least one element of the program state information. The processing module may be to execute the executable binary code.

In causing the at least one element of the program state information to be relocated, the binary translator module may be to cause at least one of argument stacks to be relocated, spilled register stacks to be relocated, central processing unit (CPU) stacks to be relocated or local variables to be relocated based on a random offset. In one embodiment, the processing module may also be to set the protected function to be non-executable and to generate the indication when execution of the protected function is attempted. The binary translator module may also be to determine if the indication was received when attempting to execute a first instruction in the program. If it is determined that the indication was received when trying to execute the first instruction in the program, then the binary translator may also be to insert move commands into the program. For example, the inserted move commands may be to cause the at least one element of the program state information to be relocated in the memory module. The inserted move commands may also be to pass at least one argument needed to execute the program in registers other than the stack register. Additionally, the inserted move commands may be to retrieve relocated program state information for use in executing the function. An example method consistent with the present disclosure may include receiving an indication that an attempt has been made by a program to execute a protected function, identifying the program that caused the indication, causing at least one element of program state information corresponding to the program to be relocated, translating instructions in the program into executable binary code based on the relocated at least one element of the program state information, and executing the executable binary code.

Over the past few decades, malicious code injection has been the most prevalent attack by which security may be breached in a device. In response, some manufacturers (e.g., Intel, AMD, etc.) started to incorporate data execution protection such as, for example, write XOR execute (W^X) security features into their processing devices. W^X allows certain section of executable code to be marked either writable or executable, but not both. In this manner, malicious injected code may be written into a device but may not be executed. W^X and other similar protection schemes have been widely adopted as hardware-implemented security not subject to the vulnerabilities of software-based solutions.

However, more recently alternative ways have been devised to circumvent data execution protection through, for example, return oriented programming (ROP) attacks. ROP may divert control flow of a program without the need for malicious code injection. Instead, the attack may chain together gadgets (e.g., subroutines that may be called by a program and then return to the place from where they were called) already existing in a device by placing addresses of gadgets on the program stack. This stack manipulation allows attackers to "construct" a program from gadgets that would otherwise pose no threat to the device. Programs constructed in this manner may perform very differently from what was intended by the original gadget creator, and may be used for malicious acts such as, for example, stealing information, corrupting information, taking control of the device, etc. All of this may be accomplished without malicious code injection.

Existing techniques that attempt to mitigate ROP are based on three vulnerabilities that may exist in devices: an absence of control flow integrity checking in programs, the location of instruction sequences (e.g., gadgets) being known to attackers beforehand and the prolific use of gadgets that may be repurposed in ROP attacks. Static flow control monitoring techniques like, for example, stack canaries and bounds checking are already employed in modern compilers (e.g., ProPolice and CRED in the GNU compiler collection). Dynamic flow control monitoring techniques may include, for example, employing shadow return stacks to observe the sanctity of control flow. However, implementation of these techniques has been limited in the industry due to performance and enabling issues. Code randomization techniques like Address Space Layout Randomization (ASLR) are designed to thwart gadget location awareness and availability for use in ROP attacks. ASLR randomizes the location of every module in a program at load time so that an attacker has a hard time locating needed gadgets. Though ASLR does not affect performance, it is also not a fool-proof technique and is still susceptible to probabilistic attacks. Research has shown that ASLR may be broken by a brute force ROP attack in less than 200 seconds. Though there have been attempts in the industry to increase the entropy provided by ASLR via position independent executable (PIE) support and kernel space randomization, ASLR is still susceptible to entropy reduction techniques such as, for example, information leakage attacks that attempt to obtain location information via data structures like *.got or *.plt in the virtual address space of a device, "heap spraying" attacks that attempt to allocate large amounts of memory on the heap to reduce the scope for randomization, and "JIT spraying" attacks that attempt to spray sufficient instances of exploit code that it is not hard to find the information needed to perform the exploit. In actual practice, recent ROP attacks on Microsoft's Internet Explorer (e.g., as documented in National Vulnerabilities Database entries CVE-2012-1875/1889) have further demonstrated that ASLR stands no chance against entropy reduction attacks.

FIG. 1 illustrates an example of binary translator driven program state relocation in accordance with at least one embodiment of the present disclosure. Consistent with at least one embodiment of the present disclosure, device 100 may include resources configured to relocate program state in a manner that allows actual programs to access their gadgets while keeping the actual location of those gadgets concealed from intruding programs (e.g., malware). Examples of device 100 may include, but are not limited to, mobile communication devices such as cellular handsets or smartphones based on the Android® operating system (OS), iOS®, Windows® OS, Blackberry® OS, Palm® OS, Symbian® OS, etc., mobile computing devices such as tablet computers like an iPad®, Galaxy Tab®, Surface®, Kindle Fire®, etc., Ultrabooks® including a low-power chipset manufactured by Intel Corporation, netbooks, notebooks, laptops, palmtops, etc., and typically stationary computing devices such as a desktops, servers, set-top boxes, etc.

Device 100 may comprise, for example, program 102, binary translator module 104, memory module 106 containing program state 108 and processing module 116'. Program 102 may include a variety of software that may be enabled to execute on device 100. Device 100 may be configured to, for example, cause program 102 to trap to binary translator module 104 when program 102 attempt to call certain functions (e.g., gadgets) in device 100. The certain functions may comprise functions that, if called in a particular manner, could be harmful to the operation of device 100. These functions may be protected, for example, using W^X protection preventing them from being executed. In this manner, if program 102 attempts to execute a protected function an error will occur, directing control to binary translator module 104. Binary translator module 104 may be configured to translate program 102 into executable binary code. However, in accordance with at least one embodiment of the present disclosure, binary translator module 104 may be further configured to perform this translation in concert with program state relocation. Program state relocation may involve moving at least one program state element stored in memory module 106 (e.g., argument stacks, spilled register stacks, central processing unit (CPU) registers, local variables, etc.) from a location 110 defined in the program stack of device 100 to another location 114 as shown at 112. For example, one or more program state elements may be offset from the corresponding stack pointer by a random offset. Program state relocation may be triggered by program 102 trapping to binary translator module 104, and may then continue on a persistent basis. Relocation of program state elements from original location 110 to new location 114 may be tracked in the modified program state.

After causing relocation of program state 108, binary translator module 104 may receive, or may just be aware of, the modified program state, and may utilize the modified program state in code translation. For example, binary translator module 104 may generate modification aware code 118 for execution by processing module. While not shown, modification aware code 118 may be stored in a code cache module (not shown). Modification aware code 118 may perform all of the functions defined in program 102, but as opposed to operating from the main program stack, modification aware code 118 may operate using memory locations 114 defined in the modified program state. Moreover, intruder 120 may attempt to gain control over the program stack in order to insert program calls to gadgets to piece together operations hostile to device 100 (e.g., to steal or delete information from device 100, to gain control of device 100, etc.). However, since the program stack of device 100 is not updated with the new locations 114 of the relocated elements of program state 108, the operations will not access desired information (e.g., they will attempt to access the original program state locations 110) and the attack will fail.

Figure 2:
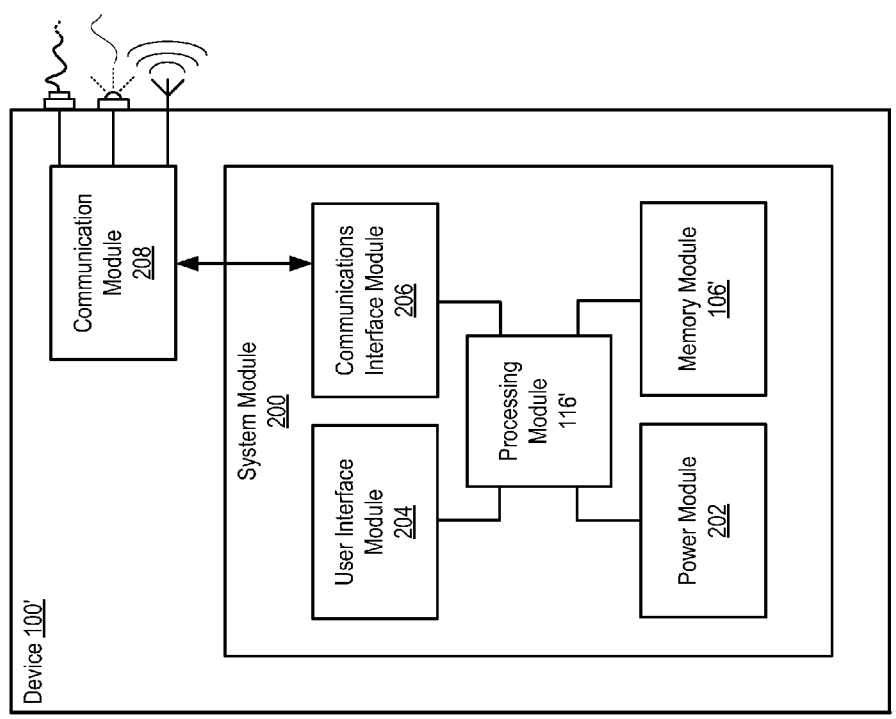
FIG. 2 illustrates an example configuration for a device usable in accordance with at least one embodiment of the present disclosure.

FIG. 2 illustrates an example configuration for device 100' usable in accordance with at least one embodiment of the present disclosure. Device 100' is an example of equipment usable to perform operations such as shown in FIG. 1. While embodiments consistent with the present disclosure may employ device 100', these embodiments are not limited only to devices with the disclosed configuration. Example device 100' may comprise system module 200 configured to manage device operations. System module 200 may include, for example, processing module 116', memory module 106', power module 202, user interface module 204 and communications interface module 206 for interacting with communication module 208. While communication module 208 has been illustrated as separate from system module 200, this location is merely for the sake of explanation herein. Some or all of the functionality associated with communication module 208 may also be incorporated within system module 200.

In device 100', processing module 116' may comprise one or more processors situated in separate components, or alternatively, may comprise one or more processing cores embodied in a single component (e.g., in a System-on-a-Chip (SOC) configuration) and any processor-related support circuitry (e.g., bridging interfaces, etc.). Example processors may include various x86-based microprocessors available from the Intel Corporation including those in the Pentium®, Xeon®, Itanium®, Celeron®, Atom®, Core® i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 116' may interact with other system components that may be operating at different speeds, on different buses, etc. in device 100'. Some or all of the functionality commonly associated with the support circuitry may also be included in the same physical package as the processor (e.g., an SOC package like the Sandy Bridge integrated circuit available from the Intel Corporation).

Processing module 116' may be configured to execute various instructions in device 100'. Instructions may include program code configured to cause processing module 116' to perform activities related to reading data, writing data, processing data, formulating data, converting data, transforming data, etc. In one embodiment, processing module 116' may be configured to perform various functions particular to the disclosed embodiments including, for example, the some or all of the functions of binary translator module 104. Information (e.g., instructions, data, etc.) may be stored in memory module 106'. Example information may comprise some or all of program 102, binary translator module 104 and program state 108. Memory module 106' may comprise random access memory (RAM) or read-only memory (ROM) in a fixed or removable format. RAM may include memory configured to hold information during the operation of device 100' such as, for example, static RAM (SRAM) or Dynamic RAM (DRAM). ROM may include memories configured as BIOS, UEFI, etc. for providing startup instructions when device 100' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. In one embodiment, memory module 106' may include a code cache module for storing executable binary code.

Power module 202 may include internal power sources (e.g., a battery) and/or external power sources (e.g., electromechanical or solar generator, power grid, fuel cells, etc.), and related circuitry configured to supply device 100' with the power needed to operate. User interface module 204 may comprise componentry configured to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and various output mechanisms (e.g., speakers, displays, lighted/flashing indicators, electromechanical components for vibration, motion, etc.). Communication interface module 206 may be configured to handle packet routing and other control functions for communication module 208, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular, satellite, etc.). In one embodiment, communication interface module 206 may be configured to prevent wireless communications that are active in communication module 208 from interfering with each other. In performing this function, communication interface module 206 may schedule activities for communication module 208 based on, for example, the relative priority of messages awaiting transmission.

In an example of operation, processing module 116' may execute program 102 and then trap program 102 into binary translator module 104 based on, for example, an attempt to call a protected function in device 100. Processing module 116' may be involved in binary translator module 104 relocating program state 108 stored in memory module 106' and translating program 102 into modification aware code 118 based on the modified program state. Processing module 116' may be involved in executing modification aware code 118. It is important to note that while in the above example modules are identified as the primary actors, it is also possible for other modules not illustrated in FIG. 2 (e.g., a specialized hardware/software-based binary translator module 104) to operate alone or in conjunction with the above example modules.

FIG. 3 illustrates example code added to a program to implement binary translator driven program state relocation in accordance with at least one embodiment of the present disclosure. The example of FIG. 3 demonstrates a relocation of program state 108 through a change of calling conventions. Example program code 300 reflects the possible content of program 102 prior to actions consistent with the present disclosure. Existing call conventions as shown at 300 pass all arguments on the program stack in device 100 (e.g., introducing vulnerability to attack).

Example program code with relocation 302 shows how relocation may be implemented consistent with the present disclosure. The first four instructions in prologue 304 may perform initial relocations of program state 108. Of particular significance, the calling conventions in example program code with relocation 302 pass the first two arguments in registers EAX and EBX as opposed to passing them on the program stack as shown in example program code 300. The instructions that follow (e.g., as shown at 306) may then reflect the modified program state so that the program accesses the correct memory locations per the modified program state. Any ROP attach that jumps into the middle of example program code with relocation 302 would not be aware of the modified program state passed in the EAX and EBX registers, and thus, would fail to find program state 108 in its expected location, which would cause the attack to fail.

Figure 4:
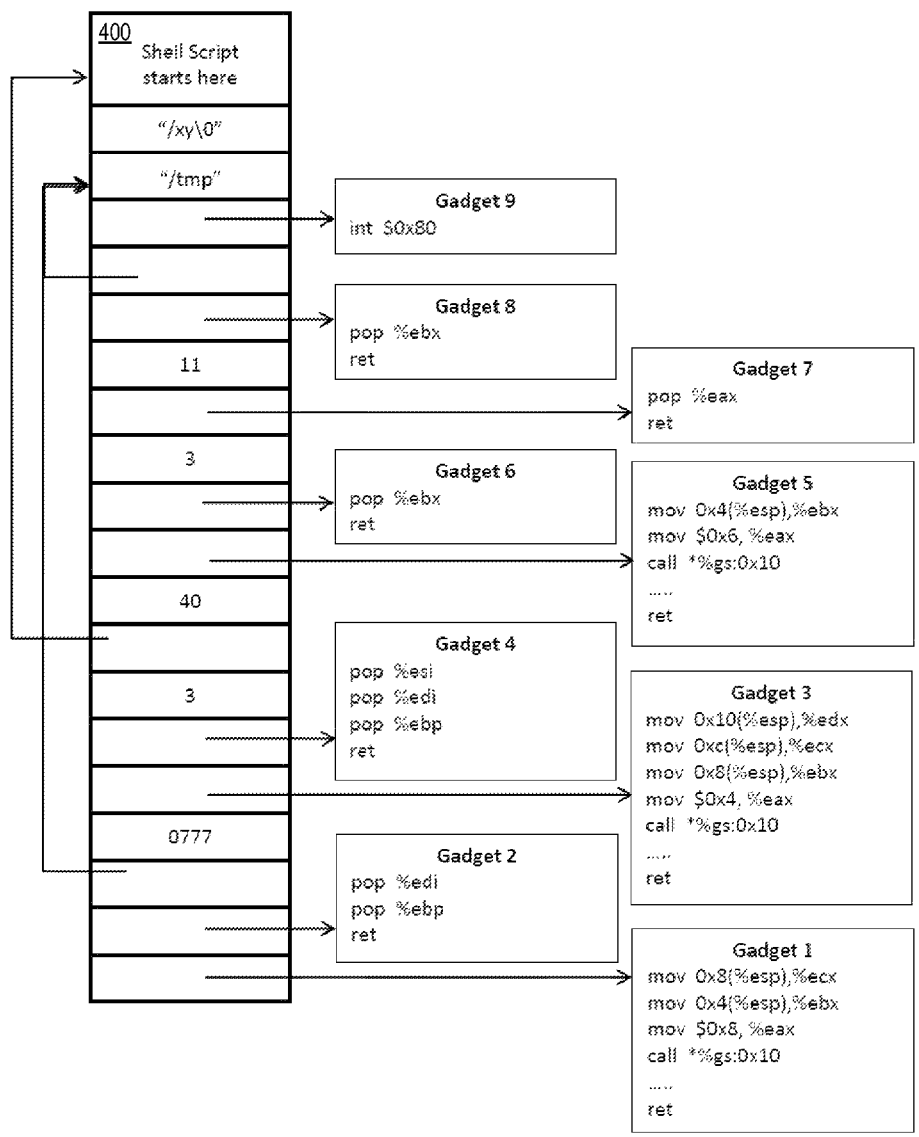
FIG. 4 illustrates example code execution that may occur during a return oriented programming (ROP) attack in accordance with at least one embodiment of the present disclosure.

FIG. 4 illustrates example code execution that may occur during an ROP attack in accordance with at least one embodiment of the present disclosure. Calls to gadgets 1 to 9 may be placed on program stack 400 to cause gadgets 1-9 to be executed with particular arguments (e.g., to cause functionality to occur that may allow an attacker to gain access to device 100). For example, based on the program state stored on program stack 400, gadgets 1, 3 and 5 may use stack pointer-relative addressing to perform create, write and close operations, respectively. Intermediate gadgets 2, 4 and 6 may then act to clear up the program state on program stack 400 using a sequence of "pop" instructions to remove information from program stack 400 so that the next gadget may execute. Gadgets 7 and 8 are single instruction gadgets that may transfer the program state stored on program stack 400 into registers so that the next gadget may find them in the corresponding registers and perform computation (e.g., system call: execve) accordingly.

Figure 5:
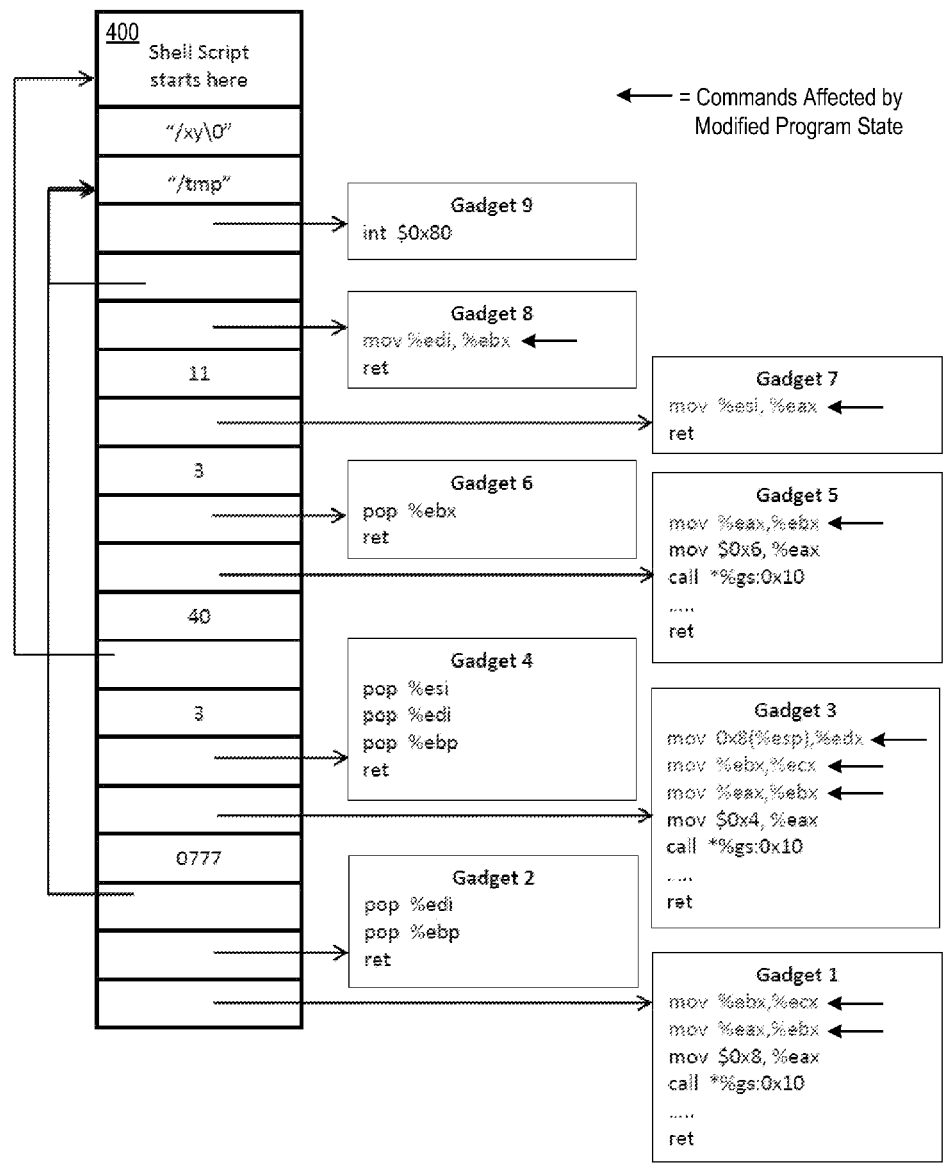
FIG. 5 illustrates example code execution when the ROP attack of FIG. 4 is redirected by translator driven program state relocation in accordance with at least one embodiment of the present disclosure.

FIG. 5 illustrates example code execution when the ROP attack of FIG. 4 is redirected by translator driven program state relocation in accordance with at least one embodiment of the present disclosure. In the example of FIG. 5, the calling conventions have been changed so that the first two arguments are always passed through registers EAX and EBX, while the remaining arguments are pushed on program stack 400. The arrows "←" in FIG. 5 indicate the instructions that may be affected by altering operation in this manner. For example, during normal operation (e.g., of program 102) gadgets 1, 3, 5 may no longer access all program state using stack pointer relative addressing, and instead expect some program state to be present in the EAX and EBX registers. However, any ROP attackers would not be aware of the arguments pushed outside of program stack 400, and as a result, would still present all program state on program stack 400. The arbitrary behavior caused by presenting all program state on program stack 400 may then defeat the malicious action intended by the attack (e.g., intended by calling gadgets 1-9).

In particular, during the normal operation of program 102 gadgets 7 and 8 fetch program state from an alternative location (e.g., the ESI and EDI registers) instead of the stack location. The ROP attacker, however, still expects gadgets 7 and 8 to fetch values from program stack 400. As a result, the computation occurring in gadget 9 operates on invalid data, causing the attack to fail. Another effect of the relocation is to eliminate the "pop-ret" sequences of gadgets 7 and 8. This may be important as pop-ret sequences may be used extensively in ROP attacks.

Figure 6:
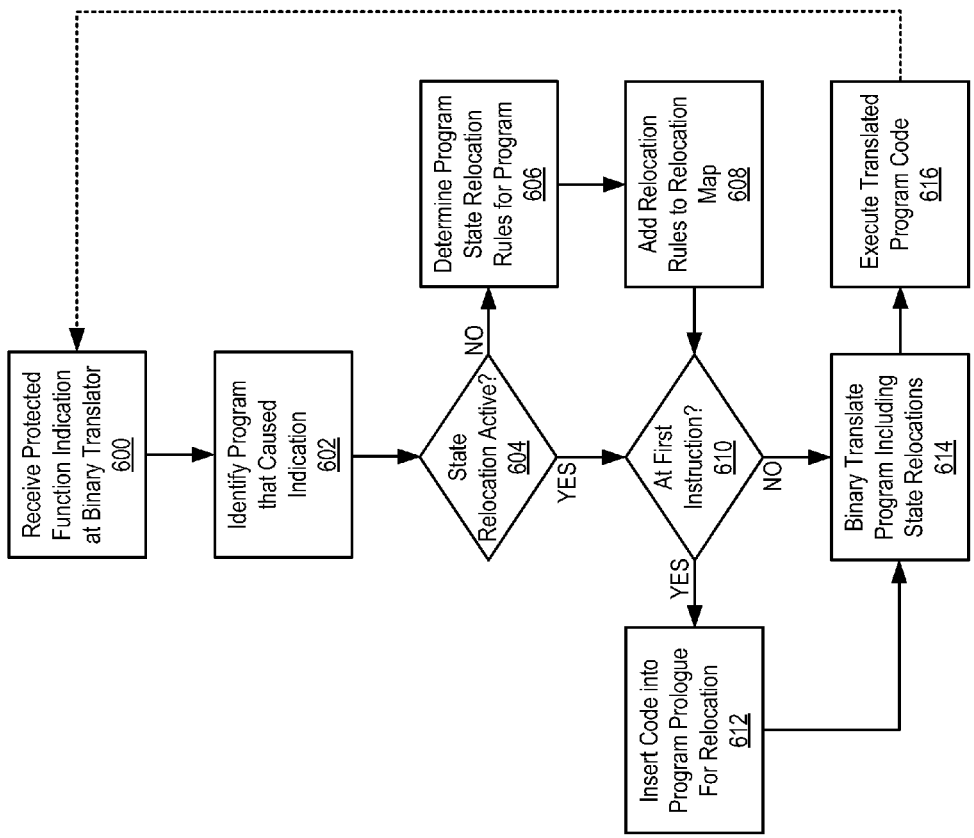
FIG. 6 illustrates example operations for binary translator driven program state relocation in accordance with at least one embodiment of the present disclosure.

FIG. 6 illustrates example operations for binary translator driven program state relocation in accordance with at least one embodiment of the present disclosure. In operation 600, an indication that attempt has been made to execute a protected function may be received at a binary translator module in a device. For example, particular functions (e.g., functions that may be used in ROP attacks) may be protected in the device as write only, and an attempt by a program to execute a function may cause the program to trap to the binary translator module. Identification of the program that caused the indication may be performed in operation 602. In operation 604, a determination may be made as to whether state relocation is already active for the program. If in operation 604 it is determined that state relocation is not already active for the program, then in operation 606 program state relocation rules may be determined. For example, program state relocation rules may set forth relocation conditions for argument stacks, spilled register stacks, CPU registers, local variables, etc. One or more of the program state elements may be relocated based on, for example, a random offset from the program stack pointer, etc. In operation 608, the relocation rules that were determined in operation 606 may then be added to a relocation map for implementation in the device. In embodiments consistent with the present disclosure, adding the relocation rules to the relocation map may allow relocation to be persistent for the program.

Following a determination in operation 604 that state relocation is already active for the program, or alternatively following operation 608, a further determination may then be made in operation 610 as to whether the program was trapped at the first instruction. If in operation 610 it is determined that the program was trapped at the first instruction, then in operation 612 code may be inserted into the program (e.g., such as shown at 304 in FIG. 3) to perpetuate relocation of the program state. Following a determination in operation 610 that trapping of the program did not occur at the first instruction, or alternatively following operation 612, in operation 614 the program may be binary translated into an executable form. The translation of the program into executable binary code in operation 614 may be based on the relocated program state so that the program may know where to access resources after the relocation. In operation 616 the translated program code (e.g., the executable binary code) may then be executed. While not illustrated in FIG. 6, an intermediate operation may be performed wherein the executable binary code is loaded into memory (e.g., a code cache module) prior to executing the code. Optionally, operation 616 may be followed by a return to operation 600 to, for example, prepare for the next indication that a program has attempted to execute a protected function in the device.

While FIG. 6 illustrates various operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more machine-readable storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eM-MCs), secure digital input/output (SDIO) cards, magnetic or optical cards, or any type of media suitable for storing electronic instructions. Other embodiments may be implemented as software modules executed by a programmable control device.

Thus, this disclosure is directed to binary translator driven program state relocation. In general, a device may protect vulnerable program functions by setting them as non-executable. If an attempt is made to execute a protected program function, the program may trap to a binary translator in the device that may be configured to relocate program state from what has already been established (e.g., on a stack register). Program state may include resources (e.g., memory locations) used by the program during the course of execution. The binary translator may then translate the program into an executable form based on the relocated program state, and may be executed accordingly. Intruding code that attempts to overcome normal program execution and implement hostile operations (e.g., based the program state that is reflected in the stack register) will not function as intended since the relocated program state will cause unexpected results.

The following examples pertain to further embodiments. In one example there is provided a device. The device may include a memory module to maintain program state information corresponding to a program, a binary translator module to receive an indication of an attempt by the program to execute a protected function, to cause at least one element of the program state information to be relocated in the memory module and to translate instructions in the program into executable binary code based on the relocated at least one element of the program state information, and a processing module to execute the executable binary code.

The above example device may be further configured, wherein the binary translator module is further to cause at least one of argument stacks to be relocated, spilled register stacks to be relocated, central processing unit (CPU) registers to be relocated or local variables to be relocated based on a random offset.

The above example device may be further configured, alone or in combination with the above further configurations, wherein the processing module is further to set the protected function to be non-executable and to generate the indication when execution of the protected function is attempted.

The above example device may be further configured, alone or in combination with the above further configurations, wherein the binary translator module is further to determine if the indication was received when attempting to execute a first instruction in the program. In this configuration the example device may be further configured, wherein the binary translator module is further to insert move commands into the program if it is determined that the indication was received when attempting to execute the first instruction in the program. In this configuration the example device may be further configured, wherein the inserted move commands are to cause the at least one element of the program state information to be relocated in the memory module. In this configuration the example device may be further configured, wherein the inserted move commands are further to pass at least one argument needed to execute the program in registers other than a stack register. In this configuration the example device may be further configured, wherein the inserted move commands are further to retrieve relocated program state information for use in executing the program.

In another example there is provided a method. The method may include receiving an indication that an attempt has been made by a program to execute a protected function, identifying the program that caused the indication, causing at least one element of program state information corresponding to the program to be relocated, translating instructions in the program into executable binary code based on the relocated at least one element of the program state information; and executing the executable binary code.

The above example method may be further configured, wherein causing the at least one element of the program state information corresponding to the program to be relocated comprises at least one of relocating argument stacks, relocating spilled register stacks, relocating central processing unit (CPU) registers or relocating local variables based on a random offset.

The above example method may further comprise, alone or in combination with the above further configurations, setting the protected function to be non-executable, and generating the indication when execution of the protected function is attempted.

The above example method may further comprise, alone or in combination with the above further configurations, determining if the indication was received when attempting to execute a first instruction in the program. In this configuration the example method may further comprise inserting move commands into the program if it is determined that the indication was received when attempting to execute the first instruction in the program. In this configuration the example method may be further configured, wherein the inserted move commands are to cause the at least one element of the program state information to be relocated in the memory module. In this configuration the example method may be further configured, wherein the inserted move commands are further to pass at least one argument needed to execute the program in registers other than a stack register. In this configuration the example method may be further configured, wherein the inserted move commands are further to retrieve relocated program state information for use in executing the program.

In another example there is provided a system arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device configured with continuation of trust for platform boot firmware arranged to perform any of the above example methods.

In another example there is provided a device having means to perform any of the above example methods.

In another example there is provided a device. The device may include a memory module to maintain program state information corresponding to a program, a binary translator module to receive an indication of an attempt by the program to execute a protected function, to cause at least one element of the program state information to be relocated in the memory module and to translate instructions in the program into executable binary code based on the relocated at least one element of the program state information, and a processing module to execute the executable binary code.

The above example device may be further configured, wherein the binary translator module may further be to cause at least one of argument stacks to be relocated, spilled register stacks to be relocated, central processing unit (CPU) registers to be relocated or local variables to be relocated based on a random offset.

The above example device may be further configured, alone or in combination with the above further configurations, wherein the binary translator module is further to determine if the indication was received when attempting to execute a first instruction in the program and, if it is determined that the indication was received when attempting to execute the first instruction in the program, to insert move commands into the program. In this configuration the example device may be further configured, wherein the inserted move commands are to cause the at least one element of the program state information to be relocated in the memory module. In this configuration the example device may be further configured, wherein the inserted move commands are further to pass at least one argument needed to execute the program in registers other than a stack register. In this configuration the example device may be further configured, wherein the inserted move commands are further to retrieve relocated program state information for use in executing the program.

In another example there is provided a method. The method may include receiving an indication that an attempt has been made by a program to execute a protected function, identifying the program that caused the indication, causing at least one element of program state information corresponding to the program to be relocated, translating instructions in the program into executable binary code based on the relocated at least one element of the program state information, and executing the executable binary code.

The above example method may be further configured, wherein causing the at least one element of the program state information corresponding to the program to be relocated comprises at least one of relocating argument stacks, relocating spilled register stacks, relocating central processing unit (CPU) registers or relocating local variables based on a random offset.

The above example method may further comprise, alone or in combination with the above further configurations, determining if the indication was received when attempting to execute a first instruction in the program, and inserting move commands into the program if it is determined that the indication was received when attempting to execute the first instruction in the program. In this configuration the example method may be further configured, wherein the inserted move commands are to cause the at least one element of the program state information to be relocated in the memory module. In this configuration the example method may be further configured, wherein the inserted move commands are further to pass at least one argument needed to execute the program in registers other than a stack register. In this configuration the example method may be further configured, wherein the inserted move commands are further to retrieve relocated program state information for use in executing the program.

In another example there is provided a system arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In one example there is provided a device. The device may include a memory module to maintain program state information corresponding to a program, a binary translator module to receive an indication of an attempt by the program to execute a protected function, to cause at least one element of the program state information to be relocated in the memory module and to translate instructions in the program into executable binary code based on the relocated at least one element of the program state information, and a processing module to execute the executable binary code.

The above example device may be further configured, wherein the binary translator module being to cause the at least one element of the program state information to be relocated comprises the binary translator module being to cause at least one of argument stacks to be relocated, spilled register stacks to be relocated, central processing unit (CPU) registers to be relocated or local variables to be relocated based on a random offset.

The above example device may be further configured, alone or in combination with the above further configurations, wherein the processing module is further to set the protected function to be non-executable and to generate the indication when execution of the protected function is attempted.

The above example device may be further configured, alone or in combination with the above further configurations, wherein the binary translator module is further to determine if the indication was received when attempting to execute a first instruction in the program. In this configuration the example device may be further configured, wherein the binary translator module is further to insert move commands into the program if it is determined that the indication was received when attempting to execute the first instruction in the program. In this configuration the example device may be further configured, wherein the inserted move commands are to cause the at least one element of the program state information to be relocated in the memory module. In this configuration the example device may be further configured, wherein the inserted move commands are further to pass at least one argument needed to execute the program in registers other than a stack register. In this configuration the example device may be further configured, wherein the inserted move commands are further to retrieve relocated program state information for use in executing the program.

In another example there is provided a method. The method may include receiving an indication that an attempt has been made by a program to execute a protected function, identifying the program that caused the indication, causing at least one element of program state information corresponding to the program to be relocated, translating instructions in the program into executable binary code based on the relocated at least one element of the program state information, and executing the executable binary code.

The above example method may be further configured, wherein causing the at least one element of the program state information corresponding to the program to be relocated comprises at least one of relocating argument stacks, relocating spilled register stacks, relocating central processing unit (CPU) registers or relocating local variables based on a random offset.

The above example method may further comprise, alone or in combination with the above further configurations, setting the protected function to be non-executable, and generating the indication when execution of the protected function is attempted.

The above example method may further comprise, alone or in combination with the above further configurations, determining if the indication was received when attempting to execute a first instruction in the program. In this configuration the example method may further comprise inserting move commands into the program if it is determined that the indication was received when attempting to execute the first instruction in the program. In this configuration the example method may be further configured, wherein the inserted move commands are to cause the at least one element of the program state information to be relocated in the memory module. In this configuration the example method may be further configured, wherein the inserted move commands are further to pass at least one argument needed to execute the program in registers other than a stack register. In this configuration the example method may be further configured, wherein the inserted move commands are further to retrieve relocated program state information for use in executing the program.

In another example there is provided a system. The system may include means for receiving an indication that an attempt has been made by a program to execute a protected function, means for identifying the program that caused the indication, means for causing at least one element of program state information corresponding to the program to be relocated, means for translating instructions in the program into executable binary code based on the relocated at least one element of the program state information, and means for executing the executable binary code.

The above example system may be further configured, wherein causing the at least one element of the program state information corresponding to the program to be relocated comprises at least one of relocating argument stacks, relocating spilled register stacks, relocating central processing unit (CPU) registers or relocating local variables based on a random offset.

The above example system may further comprise, alone or in combination with the above further configurations, means for setting the protected function to be non-executable, and means for generating the indication when execution of the protected function is attempted.

The above example system may further comprise, alone or in combination with the above further configurations, means for determining if the indication was received when attempting to execute a first instruction in the program. In this configuration the example system may further comprise means for inserting move commands into the program if it is determined that the indication was received when attempting to execute the first instruction in the program. In this configuration the example system may be further configured, wherein the inserted move commands are to cause the at least one element of the program state information to be relocated in the memory module. In this configuration the example system may be further configured, wherein the inserted move commands are further to pass at least one argument needed to execute the program in registers other than a stack register. In this configuration the example system may be further configured, wherein the inserted move commands are further to retrieve relocated program state information for use in executing the program.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
    a memory module comprising a program stack to maintain unmodified program state information corresponding to a program, the program stack defining one or more first memory locations within said memory module corresponding to said unmodified program state information;
    a binary translator module to receive an indication of an attempt by the program to execute a protected function, the indication causing the program to trap to the binary translator module,
    wherein:
        in response to the indication the binary translator module is to:
            cause at least one element of the unmodified program state information to be relocated from said one or more first memory locations to one or more modified memory locations in the memory module to produce modified program state information, the modified program state information including said one or more modified memory locations; and
            generate modification aware code for execution by a processing module of said device based at least in part on said modified program state information, said modification aware code being operable when executed to perform operations of said program based on the one or more modified memory locations in said modified program state information, instead of the one or more first memory locations identified in said program stack in association with said unmodified program state; and said program stack is not updated with said one or more modified memory locations.

2. The device of claim 1, wherein the binary translator module is further to cause at least one of argument stacks, spilled register stacks, central processing unit (CPU) registers, or local variables to be relocated to said one or more modified memory locations based on a random offset.

3. The device of claim 1, wherein the processing module is further to set the protected function to be non-executable and to generate the indication when execution of the protected function is attempted.

4. The device of claim 1, wherein the binary translator module is further to determine if the indication was received when attempting to execute a first instruction in the program.

5. The device of claim 4, wherein the binary translator module is further to insert move commands into the program if it is determined that the indication was received when attempting to execute the first instruction in the program.

6. The device of claim 5, wherein the inserted move commands are to cause the at least one element of the unmodified program state information to be relocated to the one or more modified memory locations.

7. The device of claim 5, wherein the inserted move commands are further to pass at least one argument needed to execute the program in registers other than a stack register.

8. The device of claim 6, wherein the inserted move commands are further to retrieve modified program state information for use in executing the program.

9. A method, comprising:
receiving an indication that an attempt has been made by a program to execute a protected function;
in response to the indication, causing the program to trap to a binary translator module;
identifying the program that caused the indication;
with the binary translator module:
causing at least one element of unmodified program state information corresponding to the program to be relocated from one or more first memory locations identified in a program stack stored in a memory to one or more modified memory locations, so as to produce modified program state information, the modified program state information including said one or more modified memory locations; and
generating modification aware code for execution based at least in part on said modified program state information, the modification aware code being operable when executed to perform operations of said program based on the one or more modified memory locations in said modified program state information, instead of the one or more first memory locations identified in said program stack;
wherein said program stack is not updated with said one or more modified memory locations.

10. The method of claim 9, wherein causing the at least one element of the program state information corresponding to the program to be relocated comprises relocating at least one of argument stacks, spilled register stacks, central processing unit (CPU) registers, or local variables based on a random offset.

11. The method of claim 9, further comprising:
setting the protected function to be non-executable; and
generating the indication when execution of the protected function is attempted.

12. The method of claim 9, further comprising:
determining if the indication was received when attempting to execute a first instruction in the program.

13. The method of claim 12, further comprising:
inserting move commands into the program if it is determined that the indication was received when attempting to execute the first instruction in the program.

14. The method of claim 13, wherein the inserted move commands are to cause the at least one element of the unmodified program state information to be relocated to said one or more modified memory locations.

15. The method of claim 13, wherein the inserted move commands are further to pass at least one argument needed to execute the program in registers other than a stack register.

16. The method of claim 14, wherein the inserted move commands are further to retrieve modified program state information for use in executing the program.

17. At least one non-transitory machine-readable storage medium having stored thereon, individually or in combination, instructions that when executed by one or more processors result in the following operations comprising:
receiving an indication that an attempt has been made by a program to execute a protected function;
in response to the indication, causing the program to trap to a binary translator module;
identifying the program that caused the indication;
with the binary translator module:
causing at least one element of unmodified program state information corresponding to the program to be relocated from one or more first memory locations identified in a program stack stored in a memory to one or more modified memory locations, so as to produce modified program state information, the modified program state information including said one or more modified memory locations; and
generating modification aware code for execution based at least in part on said modified program state information, the modification aware code being operable when executed to perform operations of said program based on the one or more modified memory locations in said modified program state information, instead of the one or more first memory locations identified in said program stack;
wherein said program stack is not updated with said one or more modified memory locations.

18. The medium of claim 17, wherein causing the at least one element of the program state information corresponding to the program to be relocated comprises at least one of relocating: argument stacks, spilled register stacks, central processing unit (CPU) registers, or local variables based on a random offset.

19. The medium of claim 17, further comprising instructions that when executed by one or more processors result in the following operations comprising:
setting the protected function to be non-executable; and
generating the indication when execution of the protected function is attempted.

20. The medium of claim 17, further comprising instructions that when executed by one or more processors result in the following operations comprising:
determining if the indication was received when attempting to execute a first instruction in the program.

21. The medium of claim 20, further comprising instructions that when executed by one or more processors result in the following operations comprising:
   inserting move commands into the program if it is determined that the indication was received when attempting to execute the first instruction in the program.

22. The medium of claim 21, wherein the inserted move commands are to cause the at least one element of the unmodified program state information to be relocated to the one or more modified memory locations.

23. The medium of claim 21, wherein the inserted move commands are further to pass at least one argument needed to execute the program in registers other than a stack register.

24. The medium of claim 22, wherein the inserted move commands are further to retrieve modified program state information for use in executing the program.

* * * * *